May 10, 1938.  G. A. BOUVIER ET AL  2,116,593
CUTTING OR MILLING MACHINE
Filed April 13, 1934   2 Sheets-Sheet 1

INVENTORS
G. A. BOUVIER
H. R. LAIRD
BY H. A. Whitehorn
ATTORNEY

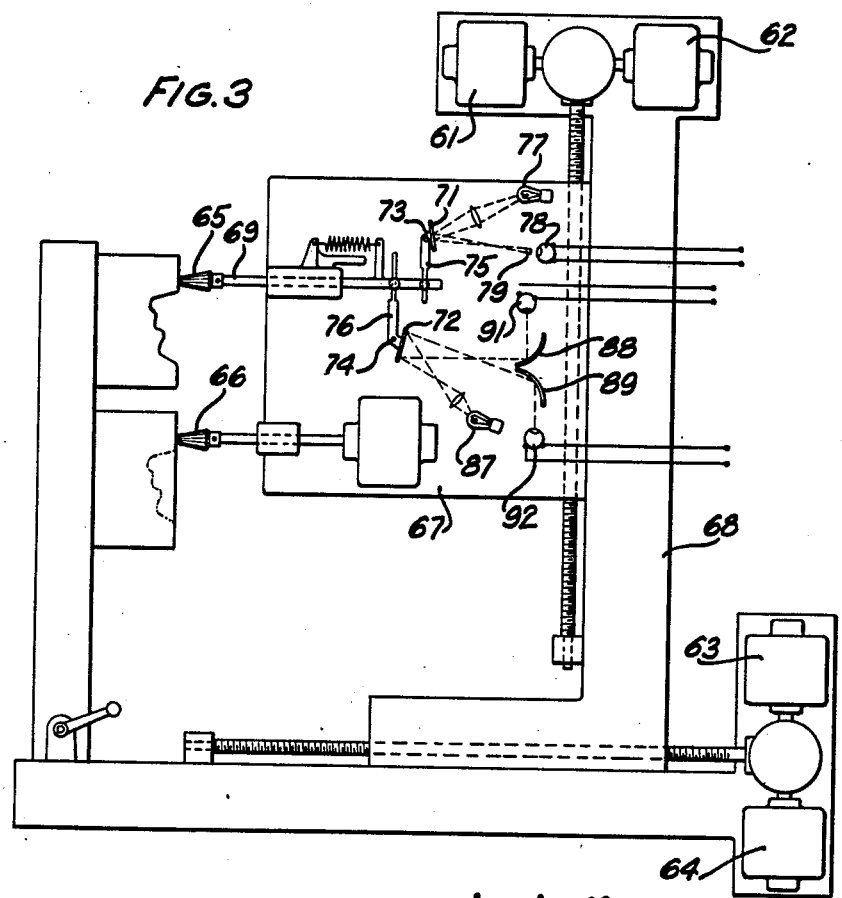
May 10, 1938.     G. A. BOUVIER ET AL     2,116,593
CUTTING OR MILLING MACHINE
Filed April 13, 1934     2 Sheets-Sheet 2
INVENTORS
G. A. BOUVIER
H. R. LAIRD
BY H. Q. Whitehorn
ATTORNEY Patented May 10, 1938

2,116,593

UNITED STATES PATENT OFFICE 2,116,593

CUTTING OR MILLING MACHINE

George A. Bouvier and Harold R. Laird, Chicago, Ill., assignors to Western Electric Company, Incorporated, New York, N. Y., a corporation of New York Application April 13, 1934, Serial No. 720,384

9 Claims. (Cl. 90—13.5)

This invention relates to cutting or milling machines and more particularly to machines for reproducing objects from patterns sometimes referred to as engraving or die sinking machines.

An object of the invention is to provide a machine for accurately and efficiently cutting objects.

In accordance with one embodiment of the invention, a milling machine is provided for imparting lateral and forward movement to a milling tool in which the speed of travel of the milling tool in either the forward or lateral direction is correlated to the speed of travel of the tool in the other direction, that is to say, the speed of travel of the tool in one direction is a function of the speed of travel of the tool in the other direction whereby the contour of the cut outline is made smooth and accurately follows the outline of the pattern.

Other objects and advantages will appear as the description proceeds.

A complete understanding of the invention may be had by reference to the following description taken in conjunction with the accompanying drawings, in which Fig. 1 is a plan view, partly schematic, of an apparatus embodying the invention;

Fig. 3 is a plan view, partly schematic, of a modified form of the invention; and Fig. 4 is a circuit diagram of an electrical control apparatus for the device shown in Fig. 3.

Figure 1:
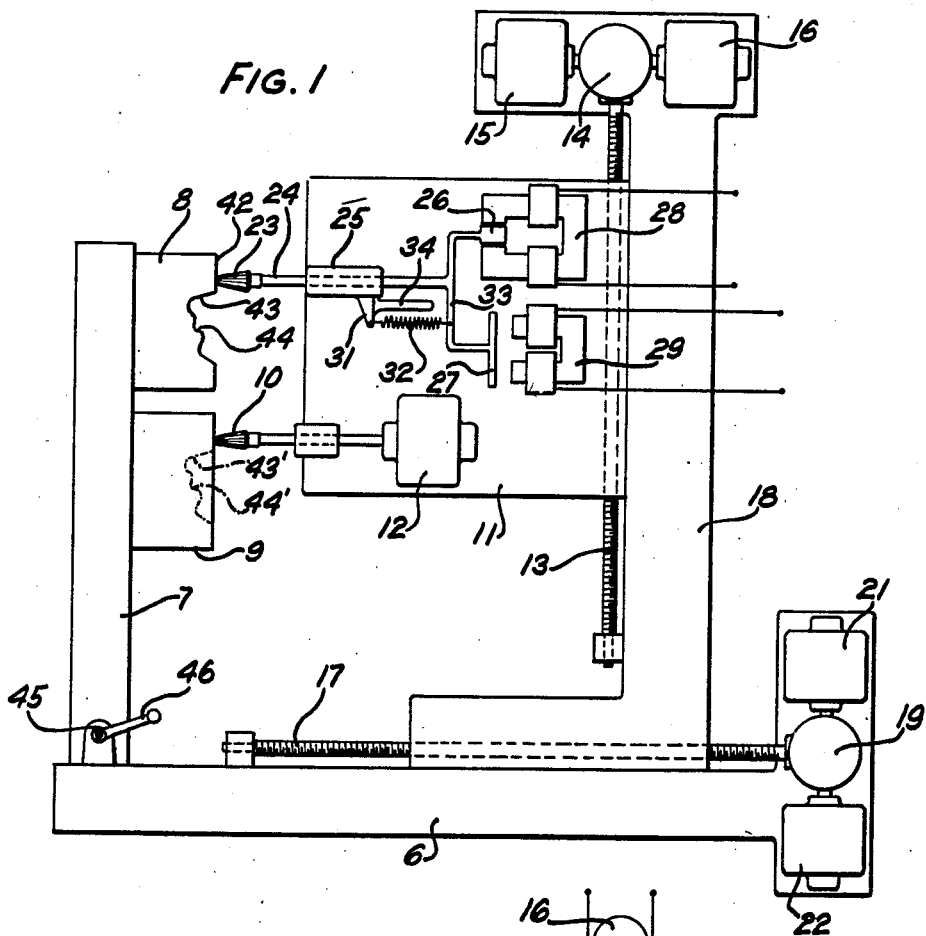
Figure 2:
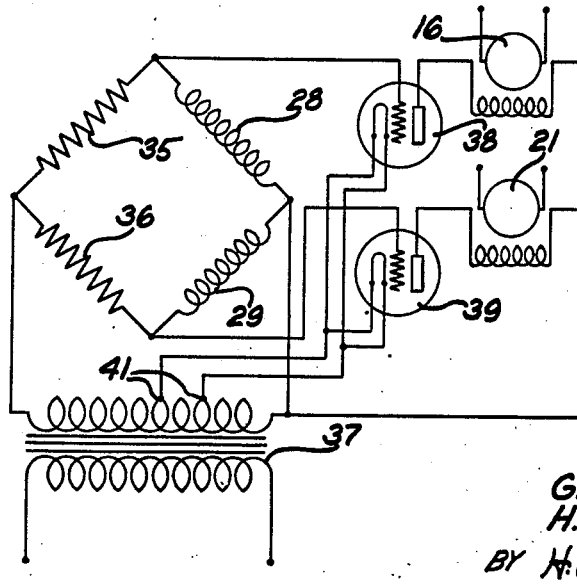
Fig. 2 is a circuit diagram of the electrical control means.

Referring now more in detail to the drawings, the apparatus is mounted on a base 6 having a support 7 for holding a pattern 8 and a piece of work 9 to be milled to correspond to the pattern 8. The milling tool 10 is mounted on a movable support 11 and may be rotated by an electrical motor 12 also mounted on this support. The support 11 is capable of both lateral and forward motion. Forward motion is imparted to the support by a threaded shaft 13 which engages a corresponding internal thread on the support. The shaft is mounted on a carriage 18 and is driven through a differential drive 14 and a pair of motors 15 and 16 also mounted on the carriage. The motor 15 is a constant speed motor while the motor 16 is a variable speed motor. Thus when the motors 15 and 16 rotate at the same speed, the shaft 13 will stand still; and when the motor 16 travels at a faster speed than the speed of the motor 15, the shaft 13 will rotate in such a direction as to advance the support. Lateral movement is imparted to the support 11 by means of a threaded shaft 17 which cooperates with an internal thread in the carriage 18. The shaft 17 is actuated through a differential drive 19 by motors 21 and 22. The motor 22 is a constant speed motor and the motor 21 is a variable speed motor. When the speeds of the motors 21 and 22 are the same, the shaft 17 will stand still. When the speed of the motor 21 is either greater or less than the speed of the motor 22, the carriage 18 will move either to the right or to the left.

A movable guide member 23 is carried by the support 11, and it is preferably of the same shape as the milling tool 10. The guide member is attached to a shaft 24 which is slidable in a sleeve 25. The opposite end of shaft 24 has a pair of armatures 26 and 27 of magnetic material attached thereto. These armatures cooperate with impedance devices 28 and 29, respectively. The impedance device 28 is substantially U-shaped and forms an air gap in which the armature 26 is movable. When the armature 26 is in the position shown in Fig. 1, the impedance device 28 will have its maximum impedance and as the armature is moved either to the right or to the left of the position shown in Fig. 1, the impedance of the device 28 will decrease. The impedance device 29 is also substantially U-shaped and the armature 27 is substantially a straight bar which may approach or recede from the ends of the U-shaped impedance device 29 to vary its impedance. In the position of the armature 27, shown in Fig. 1, the impedance of the impedance device 29 will have an intermediate value which will decrease as the armature 27 recedes therefrom and increase as the armature 27 approaches thereto.

The sleeve 25 is provided with a lateral projection 31 to which a spring is attached, the other end of which is attached to a cross arm 33 of shaft 24, and tends to normally hold the cross arm 33 against a stop 34. The impedance devices 28 and 29 are preferably disposed in a bridge circuit, the complementary arms of which comprise resistances 35 and 36. Energy is supplied to the input points of the bridge by means of a transformer 37 and the output points of the bridge are connected to the grids of relays 38 and 39. These relays are preferably of the mercury vapor type known as thyratrons and carry sufficient current to energize the field windings of motors 16 and 21 which are connected in the plate circuits of the relays. The armatures of these motors are supplied from a constant potential source of energy. If, therefore, the field current of one of these motors increases, its speed will decrease and vice versa.

The filaments of the relays may be connected to points 41 on the secondary winding of transformer 37. It will be seen that as the impedances of the impedance devices 28 or 29 are varied, the phase of the grid potentials applied to the grids of relays 38 or 39 will be varied relative to the phase of the plate potentials and the greater the phase displacement is the smaller the plate current of the relay will be, and the speeds of the motors 16 and 21 will vary accordingly. In the operation of the apparatus, the pattern 8 is secured to the holder 7 and a piece of work which is to have the contour of the pattern reproduced therein is also secured to the holder 7. If the support 11 at this time is away from the work such a distance that the milling cutter 10 does not contact with the work, the spring 32 will move the guide 23 toward the pattern, carrying the armatures 26 and 27 with it. The withdrawal of the armature 26 from the air gap of the impedance device 28 decreases the phase displacement between the grid and plate potentials of relay 38, thereby increasing the field current supplied to motor 16 to slow down the motor. If the armature 26 is withdrawn far enough, the motor 16 will slow down to the same speed as the motor 15 and stop the movement of the support in the forward direction.

The movement of the guide 23 inwardly also withdraws the armature 27 from the impedance device 29, thereby decreasing its impedance causing lesser phase displacement between the grid and plate potentials of the relay 39 to increase the field current and decrease the speed of the motor 21. The speeds of motors 21 and 22 are adjusted so as to be equal when the armature 27 is in the position shown in Fig. 1. The movement of the armature 27 to the left, therefore, decreases the speed of motor 21 relative to the speed of motor 22, causing the carriage 18 to be moved to the left. As the guide 23 comes in contact with the pattern, the support 11 will continue to move to the left and thus tend to return the guide to the relative position shown in Fig. 1. As the guide is being returned in this position, motor 16 will tend to increase its speed to start moving the support 11 in a forward direction and motor 21 will also tend to increase in speed to decrease the rate of movement of the carriage 18 to the left. When the guide reaches the relative position with respect to the milling tool shown in Fig. 1, motor 16 will have attained its maximum speed to move the support 11 forwardly at its maximum speed, while the motor 21 will have reached a speed equal to the speed of motor 22 to stop the movement of the carriage 18 to the left. The support will then travel parallel to the surface 42 of the pattern. When the guide reaches the surface 43 of the pattern, it will tend to be drawn inwardly by the spring 32 and the support 11 will also move inwardly to cause the milling tool 10 to cut along a similar line 43' in the work. In cutting along a line, such as line 44 of the pattern, the guide 23 will move outwardly from the position shown in Fig. 1 causing the armature 26 to move to the right from the position shown in Fig. 1. This movement of armature 26 will have a similar effect as when it is moved to the left since it will tend to increase the size of the air gap and the motor 16 will again be slowed down to slow down the advance of support 11. The movement of armature 27 to the right from the position shown in Fig. 1 will, however, continue to increase the speed of motor 21 until it exceeds the speed of motor 22, causing the carriage 18 to be moved to the right to cut along the surface 44' of the work. With this arrangement the speed of travel of the support 11, which carries the milling cutter 10 in one direction, is always correlated to the speed of travel of the milling tool in the other direction. As a result of this movement, a smooth line may be cut at any angle.

In many of the milling machines on the market, the speed of the cutting tool is constant in the forward direction, as well as in the lateral direction when the tool is moved laterally, which results in the cutting of an undulated or stepped line. The coordination of the speeds of travel of the cutting tool in the forward and lateral direction completely overcomes this difficulty.

In cutting a three dimensional contour, a pattern having the desired configuration is placed in the holder and the milling tool is caused to pass through the above described operation a number of times moving the support 7 slightly each time in a direction perpendicular to the movement of the support 11. This may be accomplished by providing the support 11 with an internal thread and mounting it on a screw threaded shaft 45 which may be rotated by means of a handle 46.

The modification of the invention shown in Figs. 3 and 4 is identical with the embodiment described above except for the control mechanism; and, therefore, a detailed description of the similar parts will not be necessary.

The motor 61 in this embodiment is again a constant speed motor and the associated motor 62 is a variable speed motor, the speed of which varies with the current applied to its field winding. The motors 63 and 64, however, are both variable speed motors. In the relative positions of the guide 65 and milling tool 66, shown in Fig. 3, where the guide is in lateral alignment with the cutting tool, the motors 61 and 62 will have their maximum difference of speed to drive the support 67 at its maximum rate of travel in the forward direction while the motors 63 and 64 have the same speed so that there will be no lateral movement of the support 67 or carriage 68. The guide 65 is secured to a rod 69. Mirrors 71 and 72 are pivotally mounted at 73 and 74, respectively, and these mirrors are attached to arms 75 and 76, respectively, pivotally connected to rod 69 in such a manner that the lateral shifting of the rod will cause the mirrors to oscillate about their pivotal points. A source of light 77 has its rays converged on mirror 71 from which they are reflected in the direction of a photoelectric cell 78. A screen 79 is interposed in the path of the reflected rays so that when the mirror 71 is in the position shown in Fig. 3, the reflected rays will strike the screen and be intercepted thereby. However, upon any relative movement of the guide 65, the mirror will be pivoted in one direction or the other causing the light to pass to either one side or other of the screen and strike the photoelectric cell 78. The photoelectric cell is associated with the control circuit of motor 62. This circuit is supplied from a transformer 81 having secondary windings 82 and 83. The secondary winding 82 supplies the field winding of motor 62 with current through the plate circuit of a relay 84 which is preferably of the mercury vapor filled type to supply a large amount of current. A condenser 85 and photoelectric cell 78 are connected in series to the output terminals of transformer 82 and the grid of relay 84 is connected to a point between condenser 85 and photoelectric cell 78. The amount of light impinging on the photoelectric cell controls the phase relationship between the grid and plate potentials of the relay. Thus when the light is blocked from the photoelectric cell 78, the phase displacement of the grid and plate potentials of relay 84 will be relatively large, allowing a relatively small current to be supplied to the field winding of motor 62. The motor 62 will, therefore, operate at a higher speed than the motor 61, causing the support 67 to travel at its maximum rate in the forward direction. When a beam of light strikes the photoelectric cell due to the pivoting of the mirror 71 in either direction, the phase displacement of the grid and plate potentials of relay 84 will decrease causing a larger current to be supplied to the field winding motor 62 causing the motor to slow down which will result in a slowing down of the rate of travel of the support 67 in the forward direction.

A displacement of the guide 65 will also cause the mirror 72 to pivot simultaneously with the pivoting of mirror 71. A source of light 87 has its rays converged on mirror 72 from which it is reflected onto concave mirrors 88 and 89. These mirrors are so disposed that when the mirror 72 is in the position shown in Fig. 3 the reflected light will be equally divided between photoelectric cells 91 and 92. The photoelectric cells 91 and 92 are associated with the control circuits of motors 63 and 64, respectively. Relay 93 supplies current to the field winding of the motor 63 through its plate circuit and the phase relationship of the grid and plate potentials of this relay is controlled by the photoelectric cell 91 which is connected in series with a condenser 94 to the output terminals of transformer 83, while the grid is connected to a point between the photoelectric cell and the condenser. The field current for motor 64 is controlled by a relay 96 wherein the phase displacement of the grid and plate potentials is controlled by connecting the grid to a point between the photoelectric cell 92 and condenser 97 connected in series to the output terminals of transformer 83. Thus when the light reflected from the mirror 72 and mirrors 88 and 89 is equally divided between photoelectric cells 91 and 92, the motors 63 and 64 will rotate at the same speed, causing the carriage 68 to remain stationary. However, when the guide 65 is shifted from its relative lateral position with respect to the milling tool 66, the mirror 72 will be pivoted, causing more light to be cast upon one of the photoelectric cells 91 or 92 and less light to be cast on the other. Which of the photoelectric cells 91 or 92 receives the greater amount of light will depend upon the direction in which the mirror 72 is oscillated. This change in the amount of light reaching the photoelectric cells 91 and 92 will cause the speeding up of one of the motors 63 and 64 and the slowing down of the other. Thus when the mirror 72 is pivoted in either direction, one of these motors will slow down and the other speed up, causing the carriage 68 to be moved laterally in one direction or the other. Since the speeds of both motors 63 and 64 are varied upon a lateral displacement of the guide 65 with respect to the milling tool 66, a very sensitive arrangement is provided which will cause the milling tool 66 to follow the guide 65 in a smooth line, avoiding the stepped action so common in many reproducing machines.

While the invention has been described in connection with particular embodiments thereof, it will be understood that the invention is not so limited and that many changes and modifications may be made therein without departing from the spirit and scope of the invention.

What is claimed is:

1. A milling machine comprising a support, a tracer mounted for relative movement on said support, a milling tool mounted on said support, a differential drive including a pair of motors for driving said support in one direction, a second differential drive including a pair of motors for driving said tool in another direction, and means for controlling said drives in response to the relative position of said tracer to control the movement of said tool.

2. A milling machine, comprising a milling tool, a differential drive including a pair of motors for driving said tool in one direction, a second differential drive including a pair of motors for driving said tool in another direction, a guide movable relative to said tool, and coordinated control means for both of said drives actuated by said guide for controlling said drives.

3. A milling machine comprising a milling tool, a guide laterally displaceable relative to said tool, control circuits for controlling the travel of said milling tool including an impedance device having a maximum impedance when there is no relative displacement between the guide and tool, and an impedance device having intermediate impedance when there is no relative displacement between the guide and the tool.

4. A milling machine comprising a milling tool, a motor for controlling the travel of said tool in one direction, a motor for controlling the travel of the tool in another direction, a guide laterally displaceable relative to said tool, a control circuit for each of said motors, one control circuit including an impedance device having a maximum impedance when there is no relative displacement between the guide and tool, the other motor circuit including an impedance device having intermediate impedance when there is no relative displacement between the tool and guide.

5. A milling machine comprising a milling tool, a guide displaceable relative to said tool, a pair of mirrors adapted to be oscillated by the relative displacement of said guide, a source of light for each of said mirrors, a control circuit including a photoelectric cell associated with one of said mirrors for controlling the travel of said tool in one direction, and a control circuit including a photoelectric cell associated with the other of said mirrors for controlling the travel of the tool in another direction.

6. A milling machine comprising a cutting tool, means for moving said cutting tool along a predetermined path including a pair of electric drives, a bridge circuit including a control element for each of said drives, and a tracer movable relative to said tool for effecting said control element to cause the tool to be moved along said path.

7. A milling machine comprising a bridge circuit having variable impedance arms, a tracer for effecting a variation of said impedances, a cutting tool, electric means for moving said cutting tool along a predetermined path, and means responsive to the variations of said impedances for controlling said electric means.

8. A milling machine comprising a cutting tool, electric motors having separately excited field circuits for moving said tool along a predetermined path, a control element in each of said field circuits, and a tracer for effecting each of said control elements to cause the tool to move along said path.

9. A milling machine comprising a cutting tool, an electric motor for moving said cutting tool in one direction, a second electric motor for moving the cutting tool in a transverse direction, a tracer, and means actuated by said tracer for controlling the speeds of said motors to move said cutting tool along a predetermined path.

GEORGE A. BOUVIER.
HAROLD R. LAIRD.